United States Patent [19]
Nelson

[11] 3,770,247
[45] Nov. 6, 1973

[54] GATE VALVE HAVING PRESSURE BALANCED STEM

[75] Inventor: Norman A. Nelson, Houston, Tex.

[73] Assignee: Texas Iron Works, Inc., Houston, Tex.

[22] Filed: Sept. 29, 1971

[21] Appl. No.: 184,871

[52] U.S. Cl. .................. 251/282, 251/268, 251/214
[51] Int. Cl. ......................... F16k 3/00, F16k 31/50
[58] Field of Search ...................... 251/14, 266, 267, 251/268, 269, 282

[56] References Cited
UNITED STATES PATENTS

| | | | |
|---|---|---|---|
| 2,765,143 | 10/1956 | Best .................................. | 251/268 |
| 2,897,836 | 8/1959 | Peters et al. .................... | 251/282 X |
| 3,028,878 | 4/1962 | Natho ............................. | 251/282 X |
| 3,143,143 | 8/1964 | Taylor et al. ................... | 251/282 X |
| 3,331,583 | 7/1967 | Baker............................. | 251/282 X |

Primary Examiner—Henry T. Klinksiek
Attorney—Tom Arnold et al.

[57] ABSTRACT

A gate valve assembly of the arising stem type having means to communicate fluid pressure to each extremity of the valve stem for the purpose of controlling the development of forces induced by fluid pressure that might make operation of the valve difficult. The valve stem might be provided with a fluid passage to conduct fluid pressure from the valve body to the outer extremity of the valve stem. A cylinder may be provided about the valve stem within which may be received a piston carried by the valve stem having the effect of defining an effective surface area at the outer extremity of the valve stem that substantially equals or controllably differs from the surface area dimension of the lower extremity of the valve stem thereby causing effluent pressure to develop a desirable resultant force acting upon the valve stem.

22 Claims, 3 Drawing Figures

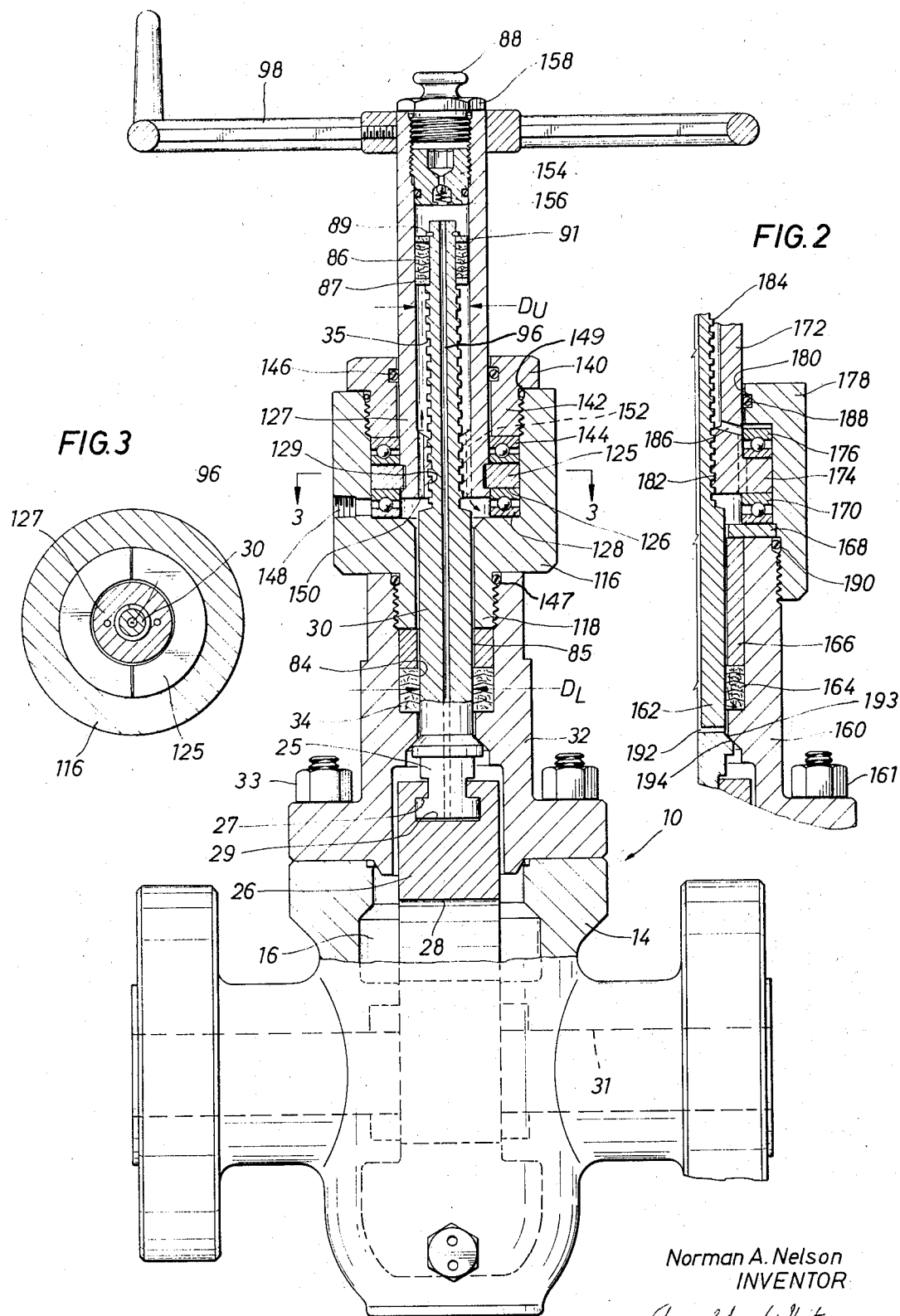
PATENTED NOV 6 1973 3,770,247

GATE VALVE HAVING PRESSURE BALANCED STEM

FIELD OF THE INVENTION

This invention relates generally to valves and more particularly to the provision of a rising stem type gate valve incorporating means to substantially pressure balance or control a resultant force induced by fluid pressure acting upon each extremity of the valve stem.

BACKGROUND OF THE INVENTION

Gate valves have long been employed in the control of fluid flowing through a conduit because gate valves can be constructed simply and inexpensively and are readily adaptable to a wide range of pressure conditions. Gate valves are generally provided with either a rotatable or reciprocatable actuating stem to impart movement to a gate member between open and closed positions thereof to control the flow of fluid through the valve. Both of these types of gate valves incorporate actuating stems that are subjected to an unbalanced pressure condition producing an outward resultant force that must be overcome or controlled as the valve is actuated. The resultant force is generally created by fluid pressure acting from a valve chamber within the body and bearing upon the surface area of the lower extremity of the valve stem that is substantially greater than atmospheric pressure acting upon the upper extremity of the valve stem. The resultant force created by this unbalanced pressure condition develops forces that must be overcome by the mechanism that is utilized to impart rotation or reciprocation to the valve stem.

Forces created by the unbalanced pressure condition acting upon the valve stem is disadvantageous because excessive wear is created on mechanical parts that are utilized to rotate or reciprocate the valve stem. Accelerated wear of operating parts create a condition requiring frequent servicing and expensive maintenance to maintain gate valves in safe operating condition. Moreover, in the event the operating pressure of the gate valve is quite high, the interengaging mechanical parts may be subjected to conditions causing galling if extremely high forces are required to impart movement to the valve stem. The forces developed by the unbalanced pressure condition also make the valve difficult to manually operate and may require a valve to be provided with a mechanical actuator if the difficulty of actuation should exceed the maximum level required for manual actuation.

The valve stem is subjected to shear forces tending to move the gate element against the downstream seat of the valve. It would be desirable to eliminate or control these particular forces, but to do so is generally considered extremely difficult if not impossible. The forces created by the unbalanced condition of the valve stem are generally added to forces necessary to overcome the friction created by the gate as it is forced by fluid pressure against the downstream valve seat thereby creating a combination of forces that must be overcome by the valve actuating mechanism. It is, of course, desirable to provide valve actuating forces that are sufficiently low to facilitate manual actuation of the valve since valve actuators are extremely expensive.

It is therefore a primary object of the present invention to provide a novel gate valve construction incorporating means to substantially eliminate or control the amount of forces that are induced by fluid pressure acting upon the actuating stem of the gate valve.

It is another object of the present invention to provide a novel gate valve assembly that incorporates a threaded actuating stem that is isolated from the effluent present in the valve body to prevent contamination or excessive wear of the threads that might otherwise be caused by the effluent.

It is an even further object of the present invention to provide a novel gate valve mechanism that incorporates thrust bearings that are disposed in a lubricant bath that is displaced back and forth across the threaded engagement area as the valve stem is reciprocated.

It is another important object of the present invention to provide a novel gate valve construction that incorporates an actuating stem so constructed that fluid pressure acting upon each extremity thereof may be substantially equal or controllably different as desired to control the nature and amount of resultant force acting upon the valve stem of the gate valve construction.

Among the several objects of the present invention is noted the contemplation of a novel gate valve mechanism that is so constructed that stress is induced in the actuating stem/gate connection only during movement of the gate thereby eliminating problems of stress corrosion that might otherwise occur if the gate stem connections were subjected to an effluent of relatively high sulphur content such as hydrogen sulfide.

It is also an object of the present invention to provide a novel gate valve construction that may include means for providing a metal-to-metal seal between the actuating stem and the valve body when the valve actuating mechanism is moved to the position fully closing the valve.

Another object of the present invention contemplates the provision of a novel gate valve construction having a stem actuating mechanism provided with a lubricant system that facilitates simultaneous lubrication of the upper and lower stem packing seals in addition to providing adequate lubrication for the threaded portion of the valve stem.

An even further object of the present invention contemplates the provision of a novel gate valve construction that effectively causes pressure thrust normally borne by stem threads to be transmitted to an actuating sleeve and to thrust bearings thereby enhancing the service life of the stem thread mechanism and substantially reducing the service requirements of the gate valve mechanism.

It is another object of the present invention to provide a novel gate valve construction having a stem back-seating mechanism that is effective to prevent communication of effluent pressure to the outer extremity of the valve stem in at least one operative position of the valve.

SUMMARY OF THE INVENTION

In one form of the present invention all of the above objects and features are accomplished. A rising stem type gate valve incorporates a valve stem having means to cause effluent pressure from a valve chamber within the valve body and to act upon the outer extremity of the valve stem and ceate a substantially balanced or conollable pressure condition which substantially lessen the amount of friction developed between the threaded valve stem and the valve actuating mechanism as the valve is actuated. According to the present invention the valve stem may be provided with a piston at the outer extremity thereof disposed in dynamic sealed engagement with the inner periphery of a rotatable valve actuating sleeve that is provided with threads at the lower extremity thereof which engage with the external threads of the valve stem. The piston may be of substantially the same diameter as the diameter of the lower portion of the valve stem thereby causing fluid pressure to be exerted upon substantially equal surface areas at each extremity of the valve stem. This feature prevents the valve stem from being subjected to an outwardly directed resultant force created by fluid pressure acting upon the lower extremity of the valve stem and effectively eliminates or controls the amount of force necessary to impart reciprocal movement to the valve stem.

The valve of the present invention incorporates a lubrication system that causes a bath of lubricant to be circulated over the threaded stem of the valve each time the valve is actuated thereby enhancing the service life of the valve construction. The oil bath also effectively lubricates each of the thrust bearings and stem packing to ensure long life of these structures.

The actuating threads of the valve stem are isolated from the effluent controlled by the valve, thereby preventing the threads from being subjected to a corrosive or erosive environment as might oherwise occur.

Alternatively, the cross-sectional area presented by the valve stem and piston may be controllably different to allow the pressurized effluent controlled by the valve to develop a resultant force biasing the valve stem inwardly or outwardly as desired. The valve mechanism may also be provided with means to isolate the piston from the effluent in a particular operating position of the valve.

BRIEF DESCRIPTION OF THE DRAWINGS

So that the manner in which the above recited features, advantages and objects of the present invention, as well as others which will become apparent, are attained and can be understood in detail, more particular description of the invention, briefly summarized above, may be had by reference to the embodiments thereof which are illustrated in the appended drawings, which drawings form a part of this specification.

It is to be noted, however, that the appended drawings illustrate only typical embodiments of the invention and are therefore not to be considered limiting of its scope, for the invention may admit to other equally effective embodiments. In the drawings:

FIG. 1 is an elevational view of a gate valve assembly constructed in accordance with the present invention and having parts thereof broken away and illustrated in section.

FIG. 2 is a fragmentary sectional view of the actuator portion of a gate valve construction representing a modified embodiment of this invention.

FIG. 3 is a sectional view taken along line 3—3 in FIG. 1.

DESCRIPTION OF PREFERRED EMBODIMENTS

Referring now to FIG. 1, a rising stem type gate valve illustrated generally at 10 may include a valve body 14 defining a valve chamber 16 within which reciprocates a gate element 26 having a flow port 28 formed therein for registration with the flow passages of the valve shown in broken line at 31. The gate element 26 may include a stem support shoulder 27 defined by a conventional T slot 29 which shoulder may be engaged by a complementary support shoulder defined by a connection element 25 formed at the lower extremity of a valve stem 30.

A bonnet 32 may be secured to the valve body 14 such as by a plurality of bolts or studs 33 and may be provided with a centrally located passage through which the valve stem 30 extends. A packing assembly 34 may be disposed within a packing chamber defined within the bonnet 32 about the valve stem and may define an inner peripheral sealing surface 84 disposed in dynamic sealed relation with a generally cylindrical surface 85 of the valve stem 30.

The packing assembly 34 may be positively retained within the bonnet 32 by an actuator adapter member 116 that may be provided within externally threaded extension 118 received by internal threads defined within the upper extremity of the bonnet 32.

At the upper extremity of the valve stem 30 above a threaded portion 35 may be secured a packing or piston 86 having its lower extremity supported by a washer 87 and its upper extremity secured by a snap-ring 89 that is received within an appropriate snap ring groove formed in the valve stem 30 and retains an upper washer 91 in assembly with the packing 86.

For the purpose of imparting reciprocation to the valve stem 30 a rotatable drive sleeve 127 may be disposed about the valve stem and may be provided with internal drive threads 129 disposed in driving engagement with the threads 35 of the valve stem. The drive sleeve 127 may be provided with an annular groove at the lower extremity thereof within which may be received flange segments 125 that cooperate to define an annular removable thrust flange shown also in FIG. 3. The thrust flange 125 may include a lower thrust surface 126 disposed in an engagement with a thrust bearing 128 supported within the actuator adapter member 116. Alternatively, the thrust flange may be formed integrally with the drive sleeve if removability is not desired.

A bearing retainer element 170 having an external threaded extension 142 may be received by internal threads formed within the upper extremity of the actuator adapter member 116. The lower extremity of the adapter 140 may be positioned for bearing engagement with an upper thrust bearing 144 having the lower portion thereof disposed in engagement with the annular flange 125. A sealing element 146, which may be an O-ring, as illustrated in FIG. 1, or which may take any other appropriate seal configuration, may be received within an internal groove formed in the retainer 140 and may establish a dynamic seal with the outer peripheral surface of tubular drive sleeve 127. It should be borne in mind that the sealing element 146 is not disposed in contact with the pressurized effluent controlled by the valve, but rather is provided merely for sealing a stem thread and bearing lubricant chamber defined within the actuator adapter element 116. The lubricant chamber is defined within the actuator portion of the valve construction between the packing 34 and a piston or upper packing 86. Lubricant is retained within the lubricant chamber by the packings and by the sealing element 146. A lower sealing element 147 may also be provided to establish a positive seal between the threaded extension 118 of the adapter and the upper extremity of the bonnet 32. A sealing element 149 may be interposed between the adapter member 116 and the threaded extension 142 of the bearing retainer element 140 to prevent extrusion of lubricant past the threads of the bearing retainer. Lubricant may be introduced through a passage 148 within which may be received any appropriate lubricant supply fitting, not shown. It will be desirable to ensure circulation of lubricant material over the moving parts of the actuator portion of the valve. According to the present invention, such means for such circulation of lubricant material may conveniently take the form illustrated in FIGS. 1 and 2 where a lubricant passage 150 may be defined within the tubular drive sleeve 127 to allow the flow of lubricant past the threaded engagement between the tubular drive element and the threads 35 of the valve stem 30. Also, if desired, an additional lubricant passage 152 may be formed in the tubular drive element 127, as illustrated in broken line, thereby facilitating circulation of the lubricant in the form of a lubricant both to enhance the service life of both the drive thread and the thrust bearings.

In order to establish a balanced or controlled pressure condition acting upon the valve stem 30 means may be provided to conduct effluent pressure from the valve chamber 16 to the outer extremity of the valve stem 30. According to the present invention such means may conveniently take the form illustrated particularly in FIG. 1 where a passage 96 is shown to extend through the valve stem 30 and terminate outwardly of the outer packing or piston 86. Such effluent pressure may be contained at the outer extremity of the tubular drive sleeve 127 by a plug member 154 that may be threadedly received by internal threads formed in the drive sleeve 127. The plug 154 may also include a check valve 156 serving the double function of containing the effluent pressure to which it is subjected and also allowing passage of fluid that might be injected into the valve through a fitting 158 that may for example have a conventional lubricant connection 88 defined thereon.

Reciprocation of the valve stem 30 may be induced by manipulation of a hand wheel 98 secured in any desirable manner to the tubular drive sleeve 127 thereby causing the interengaging threads 35 and 129 of the valve stem and tubular drive sleeve, respectively, to move the valve stem 30 upwardly or downwardly as desired. During such movement the lower stem packing 34 and the upper packing or piston 86 prevent the effluent from coming into contact with the threads of the valve stem or the thrust bearings which might otherwise cause corrosion or erosion of the threads and bearings. As was indicated above, during such reciprocation, lubricant is circulated or displaced through the passages 150 and 152 and is bathed about the threads and thrust bearings to enhance the service life thereof.

Balancing of forces created on the valve stem 30 by the pressurized effluent results from effluent pressure acting upon an effective cross-sectional area $D_L$ at the lower extremity of the valve stem and simultaneously acting upon a cross-sectional area $D_U$ at the upper extremity of the valve stem, defined by the cross-sectional area of piston 86.

If the upper cross-sectional area $D_U$ is substantially the same as the cross-sectional area $D_L$ at the lower extremity of the valve stem, fluid pressure acting upon each extremity of the valve stem will produce substantially identical forces acting at each extremity of the valve stem thereby substantially balancing the forces acting upon the valve stem and yielding a zero thrust loading on the valve stem. When it is desired to move the valve stem downwardly, there will be no substantial force opposing such movement as would otherwise be created if the valve stem 30 were subjected to the pressure of effluent at the lower extremity thereof while the upper extremity is disposed at atmospheric pressure as is conventionally the case.

In the event it is desired to produce a resultant force acting either downwardly or upwardly on the valve stem, such can be accomplished effectively by varying the relative surface areas defined by $D_U$ and $D_L$.

Referring now to FIG. 2, there is disclosed a modified embodiment of the present invention wherein a bonnet structure 160 is provided that may be secured to the valve body by a plurality of bolts or threaded studs 161. A valve stem 162 may extend through an aporpriate passage formed in the bonnet 160 and may be dynamically sealed with respect to the bonnet by a packing assembly 164 disposed about the outer periphery of the valve stem. A retainer element 166 and bearing may be received above the packing 164 and may be secured in position by a thrust washer 168 that is retained in position by an internal shoulder defined within a retainer element 178.

A lower thrust bearing 170 may rest upon the thrust washer 168 and may be entrapped against lateral movement by the retainer element 178. A tubular drive sleeve 172 may extend through an aperture 180 defined in the retainer element 178 and may be provided with a lower thrust flange 174 which may, if desired, be integral therewith and which rests upon the upper portion of lower thrust bearing 170. An upper thrust bearing 176 may be received in bearing engagement by the flange 174 and may support upward thrust loading of the tubular drive sleeve 172 by engagement with an internal shoulder defined within the retainer element 178.

For the purpose of imparting reciprocation to the valve stem 162, internal threads 182 may be provided within the tubular drive sleeve 172 which are disposed in threaded engagement with external threads 184 defined on the valve stem. As the drive sleeve 172 is rotated by manipulation of a hand wheel or the like, as described above, the thrust bearings 170 and 176 will retain the drive sleeve against linear movement thereby causing the threaded connection between the drive sleeve and valve stem to impart linear movement to the valve stem.

A lubricant passage 186 may be formed within the tubular drive sleeve 172 thereby providing for circulation of lubricant past the threaded connection between the tubular drive sleeve and the valve stem and serving to provide an oil bath for both the interengaging threads and the thrust bearings. Also, if desired, the lubricant passage 186 may be extended downwardly, as shown in broken lines, to provide for free flow of lubricant fluid about the upper and lower thrust bearings.

It may be desirable to provide for pressure balancing in all positions other than the fully closed position of the valve or it may be desirable to provide a positive metal-to-metal seal between the valve stem and bonnet that may be energized as desired. According to the present invention such features may be readily accomplished by structure taking the form illustrated in FIG. 2 where the valve stem 162 is shown to include a pressure balancing passage 192 estending from the upper extremity of the valve stem to a transverse portion of passage 192 disposed immediately above a frustoconical surface 193 defined by an enlargement at the lower extremity of the valve stem. In the closed position of the valve the frusto-conical surface 193 will be disposed in intimate sealed engagement with an internal frusto-conical surface 194 defined within the bonnet structure 160. When the valve stem 162 has been moved upwardly, bringing the frusto-conical surface 193 of the valve stem into sealed engagement with the surface 194, pressurized effluent from the valve chamber will be prevented by the metal-to-metal seal from entering the pressure balancing passage 192. It will be possible therefore to bleed effluent pressure from the outer extremity of the valve stem to establish unbalanced forces acting upon the stem, if desired. Immediately upon movement of the valve stem 162 toward the downward or open position thereof the metal-to-metal seal will be broken thereby communicating effluent pressure through pressure balancing passage 192 to the outer extremity of the valve stem where a force will be exerted thereby on the piston which will substantially balance the force produced by the effluent on the lower extremity of the valve stem if a pressure balanced condition is desired.

For the purpose of establishing upper and lower lubricant seals, to prevent loss of lubricant material from the lubricant bath, upper and lower annular sealing elements 188 and 190 may be retained within annular grooves defined by the retainer element 178.

In view of the foregoing, it is apparent that I have provided a novel rising stem type gate valve construction having an actuating stem that may be subjected to balanced or effectively controlled forces developed by the effluent controlled by the valve. Such forces effectively allow the valve actuating stem to be reciprocated essentially free of thrust loading developed by the effluent controlled by the valve. If desired, controlled upward or downward resultant forces may be developed by the effluent which acts upon the valve stem and to produce designed resultant force conditions allowing efficient opening and closing movements of the valve. I have also provided a pressure balancing concept that allows the provision of a mechanical seal under certain predetermined conditions to overcome the pressure balancing concept and prevent effluent pressure from acting upon the outer extremity of the valve stem.

I have also provided an efficient lubricant system that effectively allows the interengaging threads of the valve stem and tubular drive sleeve to be lubricated, thereby enhancing the service life thereof. The thrust bearings of my invention are also provided with a lubricant bath to ensure long operation life thereof. The operating life of my invention will be further enhanced since the effluent controlled by the valve will be prevented, by upper and lower dynamic seals, established by the packings from contacting the threads of the valve stem or the thrust bearings.

My invention therefore effectively achieves all of the objects and advantages hereinabove set forth, together with other objects and advantages that are inherent from a description of the apparatus itself. While the above description has referred to particular embodiments of my invention as it pertains to gate valves adapted for manual operation, it is to be understood that the present invention may be utilized with any appropriate powered mechanical actuator without departing from the spirit or scope of my invention. It is to be further understood that the embodiments described and illustrated herein are merely illustrative of an application of the principals of my invention and that numerous other arrangements and modifications may be made in the structures illustrated without diverting from the spirit or scope of this invention.

I claim:

1. A gate valve comprising:
   valve body means having flow passages defined therein and having a valve chamber disposed in intersecting relation with said flow passages;
   a gate valve element disposed within said valve chamber and having a flow port defined therein for registry with said flow passages in the open position of said valve and having a solid portion for blocking said flow passages in the closed position of said valve;
   bonnet means defining a closure for the upper extremity of said valve chamber;
   valve stem means being connected to said gate valve element and extending through said bonnet means; said valve stem means having a threaded portion;
   valve actuator means being fixed to said bonnet and having stem drive means threadedly received by said threaded portion of said valve stem in driving relative therewith;
   means for imparting movement to said gate valve element; and
   means communicating effluent pressure within said valve to the outer extremity of said valve stem means and controlling the direction and amount of resultant force developed by the effluent on the valve stem.

2. A gate valve as recited in claim 1:
   first packing means disposed within said bonnet and having an inside diameter establishing a dynamic seal about said valve stem means and encompassing a first cross-sectional area;
   said stem drive means defining a closed chamber about said valve stem means;
   second packing means being carried by said valve stem means and being received in dynamically sealed engagement within said stem drive means and encompassing a second cross-sectional area; and
   said effluent pressure acting simultaneously upon said first and second cross-sectional areas and developing said resultant force.

3. A gate valve as recited in claim 2:
   said first cross-sectional area being substantially equal to said second cross-sectional area and said resultant force being substantially zero.

4. A gate valve as recited in claim 2:
   said first cross-sectional area being greater than said second cross-sectional area and said resultant force urging said valve stem means outwardly away from said valve body.

5. A gate valve as recited in claim 2:
   said first cross-sectional area being less than said second cross-sectional area and said resultant force urging said valve stem means inwardly toward said valve body.

6. A gate valve as recited in claim 1:

said means communicating effluent pressure within said valve to the outer extremity of said valve to the outer extremity of said valve stem comprising an effluent passage extending axially through said valve stem.

7. A gate valve as recited in claim 1:

means defining a closed chamber outwardly of said valve stem; and fluid passage means formed in said valve stem means and communicating said effluent pressure into said closed chamber.

8. A gate valve as recited in claim 1:

said valve stem means having a generally cylindrical surface;

first packing means disposed within said bonnet and establishing a dynamically sealed relation with said cylindrical surface and encompassing a first cross-sectional area;

second packing means carried by said valve stem means;

said valve actuator means having a tubular drive sleeve being received about said valve stem and having an inner generally cylindrical surface disposed in dynamically sealed relation with said second packing means and encompassing a second cross-sectional area;

means closing one extremity of said tubular drive sleeve and defining a closed chamber outwardly of said second packing means;

means retaining said tubular drive sleeve in rotatable relation with said bonnet means; and said means communicating effluent pressure within said valve to the outer extremity of the valve stem means comprising passage means extending through said valve stem means.

9. A gate valve as recited in claim 8:

said valve actuator means further comprising actuator adapter means being carried by said bonnet means;

thrust flange means being carried by said tubular drive sleeve; and bearing means retained by said actuator adapter means and disposed in bearing engagement with said thrust flange means.

10. A gate valve as recited in claim 9:

said thrust flange means comprising a flange retainer groove defined in said tubular drive sleeve; and at least two thrust flange segments being retained within said flange retainer groove by said actuator adapter means.

11. A gate valve as recited in claim 8:

said tubular drive sleeve being disposed in threaded engagement with said valve stem and upon rotation thereof imparting reciprocal movement to said valve stem.

12. A gate valve as recited in claim 8:

means establishing a lubricant chamber within said valve actuator means; and means causing flow of lubricant material within said lubricant chamber upon actuation of said valve and lubricating said valve actuator means.

13. A gate valve as recited in claim 8:

said means closing one extremity of said tubular drive sleeve means comprising check valve means oriented to prevent escape of effluent pressure from said valve and allowing introduction of fluid into said valve.

14. A gate valve as recited in claim 1:

means preventing communication of effluent pressure to the outer extremity of said valve means in at least one operating condition of said gate valve.

15. A gate valve as recited in claim 13:

said means preventing communication of effluent pressure comprising an effluent seat surface formed within said bonnet;

an effluent seat surface defined on said valve stem and being disposed in sealed relation with said effluent seat surface of said bonnet in said one operating condition;

said means communicating effluent pressure within said valve to the outer extremity of the valve stem means being a passage extending through said valve stem means and terminating outwardly of said effluent seat surface of said valve stem; and said effluent seat surfaces of said bonnet and valve stem developing a seal in said one operating position and preventing fluid communication between said valve chamber and said passage of said valve stem means.

16. A gate valve comprising:

valve body means having flow passages defined therein and having a valve chamber disposed in intersecting relation with said flow passages;

a gate valve element disposed within said valve chamber and having a flow port defined therein for registry with said flow passages in the open position of said valve and having a solid portion blocking said flow passages in the closed position of said valve;

bonnet means defining a closure for said valve chamber;

valve stem means being connected to said gate valve element and extending through said bonnet means and being provided with a threaded portion;

tubular stem drive means being disposed about the valve stem means and being disposed in threaded engagement therewith;

means supporting said tubular drive means for rotation relative to said bonnet means;

first packing means disposed within said bonnet and having an inside diameter establishing a dynamic seal about said valve stem means and encompassing a first cross-sectional area;

second packing means being carried by said valve stem means and being received in dynamically sealed engagement within said tubular stem drive means and encompassing a second cross-sectional area;

means communicating effluent pressure within said valve chamber outwardly of said second packing means; and said effluent pressure acting simultaneously upon said first and second cross-sectional areas and developing a resultant force acting on said valve stem means.

17. A gate valve as recited in claim 16:

said first cross-sectional area being substantially equal to said second cross-sectional area and said resultant force being substantially zero.

18. A gate valve as recited in claim 16:

said first and second cross-sectional areas being different and said resultant force urging said valve stem toward one extremity thereof.

19. A gate valve as recited in claim 16:
means closing said tubular drive stem means at the outer extremity thereof;
said second packing means cooperating with said tubular drive means to define a closed chamber outwardly of the second packing means; and
said means communicating effluent pressure within said valve chamber outwardly of said second packing means being an effluent passage formed in said valve stem means and communicating effluent pressure into said closed chamber means.

20. A gate valve as recited in claim 19:
means establishing a lubricant chamber within said valve actuator means; and
means causing flow of lubricant material within said lubricant chamber upon actuation of said valve and lubricating said valve actuator means.

21. A gate valve as recited in claim 16:
said tubular drive stem means having a thrust flange thereon;
actuator adapter means being carried by said bonnet means and receiving said thrust flange of said tubular drive stem means; and
thrust bearing means being received by said actuator adapter means and supporting thrust loading applied to said tubular drive stem means.

22. A gate valve as recited in claim 21:
means preventing communication of effluent pressure outwardly of said second packing means in at least one operating condition of said gate valve.

* * * * *

UNITED STATES PATENT OFFICE
CERTIFICATE OF CORRECTION

Patent No. 3,770,247            Dated November 6, 1973

Inventor(s) Norman A. Nelson

It is certified that error appears in the above-identified patent and that said Letters Patent are hereby corrected as shown below:

Col. 2, line 65, "conollable" should read --controllable--.

Col. 4, line 43, "170" should read --140--.

Col. 6, line 20, "apporpriate" should read --appropriate--.

Col. 7, line 4, "estending" should read --extending--.

Col. 8, line 31, "relative" should read --relation--.

Signed and sealed this 20th day of August 1974.

(SEAL)
Attest:

McCOY M. GIBSON, JR.            C. MARSHALL DANN
Attesting Officer                Commissioner of Patents